(12) United States Patent
Sett

(10) Patent No.: US 10,502,113 B2
(45) Date of Patent: Dec. 10, 2019

(54) SELECTIVE CATALYTIC REDUCTION AMMONIA STORAGE CONTROL

(71) Applicant: GM Global Technology Operations LLC, Detroit, MI (US)

(72) Inventor: Anirban Sett, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 246 days.

(21) Appl. No.: 15/645,437

(22) Filed: Jul. 10, 2017

(65) Prior Publication Data

US 2019/0010848 A1    Jan. 10, 2019

(51) Int. Cl.
| | | |
|---|---|---|
| *F01N 3/20* | (2006.01) | |
| *F01N 9/00* | (2006.01) | |
| *F01N 11/00* | (2006.01) | |
| *F01N 3/035* | (2006.01) | |

(52) U.S. Cl.
CPC ............ *F01N 3/208* (2013.01); *F01N 3/035* (2013.01); *F01N 3/2066* (2013.01); *F01N 9/00* (2013.01); *F01N 11/00* (2013.01); *F01N 2560/026* (2013.01); *F01N 2560/06* (2013.01); *F01N 2610/02* (2013.01); *F01N 2900/0412* (2013.01); *F01N 2900/1806* (2013.01); *F01N 2900/1812* (2013.01); *F01N 2900/1821* (2013.01)

(58) Field of Classification Search
CPC ............ F02D 41/1454; F02D 41/0002; F02D 41/405; F02D 41/10; F02D 41/0235; F01N 3/0814; F01N 3/0842; F01N 3/2066; F01N 9/00; B01D 53/9418
See application file for complete search history.

(56) References Cited

U.S. PATENT DOCUMENTS

| | | | | |
|---|---|---|---|---|
| 2008/0250774 | A1* | 10/2008 | Solbrig | F01N 3/106 60/295 |
| 2009/0056315 | A1* | 3/2009 | Solbrig | F01N 3/208 60/286 |
| 2010/0028228 | A1* | 2/2010 | Gady | B01D 53/90 423/213.5 |
| 2010/0050614 | A1* | 3/2010 | Parmentier | F01N 3/208 60/287 |
| 2010/0122524 | A1* | 5/2010 | Solbrig | F01N 3/103 60/285 |
| 2011/0005209 | A1* | 1/2011 | Gady | F01N 3/103 60/295 |

(Continued)

*Primary Examiner* — Patrick D Maines
(74) *Attorney, Agent, or Firm* — Cantor Colburn LLP

(57) ABSTRACT

Technical solutions are described for an emissions control system for controlling a selective catalytic reduction (SCR) device of an exhaust system of an internal combustion engine. An example computer-implemented method includes governing a reductant dosing in the SCR device. For example, governing the dosing includes computing a reductant dosing rate based on a chemical model of the SCR device. Further, the governing includes determining a temperature modulation factor based on inlet temperature of exhaust gas input for the SCR. The method further includes adjusting the reductant dosing rate by scaling the reductant dosing rate by the temperature modulation factor. The method further includes causing an amount of reductant to be injected into an SCR catalyst according to the adjusted reductant dosing rate.

14 Claims, 9 Drawing Sheets

(56) References Cited

U.S. PATENT DOCUMENTS

| | | | |
|---|---|---|---|
| 2015/0033704 A1* | 2/2015 | Ardanese | F01N 9/007 |
| | | | 60/274 |
| 2015/0176459 A1* | 6/2015 | Cho | F01N 3/2066 |
| | | | 60/274 |
| 2016/0076421 A1* | 3/2016 | Cho | F01N 3/208 |
| | | | 60/274 |
| 2017/0030243 A1* | 2/2017 | Li | F01N 3/208 |

* cited by examiner

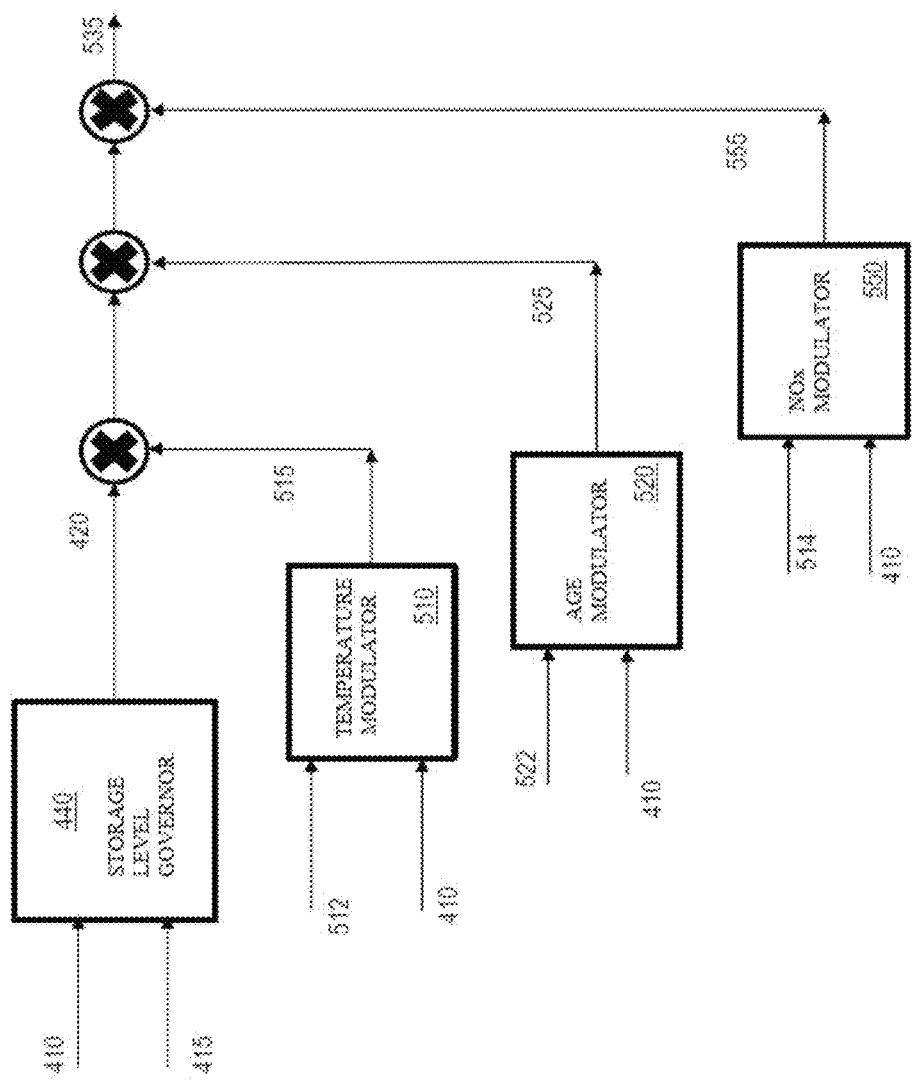

SELECTIVE CATALYTIC REDUCTION AMMONIA STORAGE CONTROL

INTRODUCTION

The present disclosure relates to exhaust systems for internal combustion engines, and more particularly to exhaust systems using selective catalytic reduction (SCR) units for emission control.

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

Exhaust gas treatment systems typically include selective catalytic reduction (SCR) devices. An SCR device includes a substrate having an SCR catalyst disposed thereon to reduce the amount of NOx in the exhaust gas. The typical exhaust treatment system also includes a reductant delivery system that injects a reductant such as, for example, ammonia (NH3), urea (CO(NH2)2, etc.). The SCR device makes use of NH3 to reduce the NOx. For example, when the proper amount of NH3 is supplied to the SCR device under the proper conditions, the NH3 reacts with the NOx in the presence of the SCR catalyst to reduce the NOx emissions. However, if the reduction reaction rate is too slow, or if there is excess ammonia in the exhaust, ammonia can slip from the SCR. On the other hand, if there is too little ammonia in the exhaust, SCR NOx conversion efficiency will be decreased.

SUMMARY

One or more embodiments describe an emissions control system for a motor vehicle including an internal combustion engine. The emissions control system includes a selective catalytic reduction (SCR) device. The emissions control system also includes an NOx sensor; and a controller that is configured to govern a reductant dosing in the SCR device by. The controller computes a reductant dosing rate based on a chemical model of the SCR device. The controller determines a temperature modulation factor based on an inlet temperature of the SCR device. The controller adjusts the reductant dosing rate by scaling the reductant dosing rate by the temperature modulation factor. The controller further causes an amount of reductant to be injected into the SCR device according to the adjusted reductant dosing rate.

In one or more examples, the reductant dosing rate is computed based on a rate of the exhaust gas that is input to the SCR device, and a difference in reductant stored in an SCR catalyst of the SCR device and a predicted amount of reductant stored in the SCR catalyst.

In one or more examples, determining the temperature modulation factor includes accessing a look-up table corresponding to the inlet temperature. In one or more examples, determining the temperature modulation factor is further based on an inlet NOx concentration in the exhaust gas that is input to the SCR device. In one or more examples, the temperature modulation factor is determined by accessing a look-up table based on the inlet temperature and the inlet NOx concentration.

In one or more examples, governing the reductant dosing in the SCR device further includes determining an age modulation factor for the SCR device, and adjusting the reductant dosing rate further by scaling the reductant dosing rate by the age factor. In one or more examples, the age modulation factor is determined by monitoring temperature-weighted time of the SCR device.

One or more embodiments include an exhaust system for treating exhaust gas emitted by an internal combustion engine, configured to perform a selective catalytic reduction (SCR) of exhaust gas. For example, the exhaust system includes a controller configured to govern a reductant dosing for the SCR. For example, the controller computes a reductant dosing rate based on a chemical model of the SCR. The controller determines a temperature modulation factor based on inlet temperature of exhaust gas input for the SCR. The controller adjusts the reductant dosing rate by scaling the reductant dosing rate by the temperature modulation factor. The controller further causes an amount of reductant to be injected into an SCR catalyst according to the adjusted reductant dosing rate.

In one or more examples, the reductant dosing rate is computed based on a rate of exhaust gases input to the SCR, and a difference in reductant stored in the SCR catalyst and a predicted amount of reductant stored in the SCR catalyst. In one or more examples, determining the temperature modulation factor includes accessing a look-up table corresponding to the inlet temperature. In one or more examples, determining the temperature modulation factor is further based on an inlet NOx concentration in the exhaust gas input to the SCR. Further, in one or more examples, the temperature modulation factor is determined by accessing a look-up table based on the inlet temperature and the inlet NOx concentration.

In one or more examples, governing the reductant dosing in the SCR further includes determining an age modulation factor for the SCR catalyst, and adjusting the reductant dosing rate further by scaling the reductant dosing rate by the age factor. Further, in one or more examples, the age modulation factor is determined by monitoring temperature-weighted time of the SCR catalyst.

Further yet, one or more embodiments are described for a computer-implemented method for controlling a selective catalytic reduction (SCR) device of an exhaust system of an internal combustion engine. In one or more examples, the method includes governing a reductant dosing in the SCR device. For example, governing the dosing includes computing a reductant dosing rate based on a chemical model of the SCR device. Further, the governing includes determining a temperature modulation factor based on inlet temperature of exhaust gas input for the SCR. The method further includes adjusting the reductant dosing rate by scaling the reductant dosing rate by the temperature modulation factor. The method further includes causing an amount of reductant to be injected into an SCR catalyst according to the adjusted reductant dosing rate.

In one or more examples, the reductant dosing rate is computed based on a rate of exhaust gases input to the SCR device, and a difference in reductant stored in an SCR catalyst of the SCR device and a predicted amount of reductant stored in the SCR catalyst.

In one or more examples, determining the temperature modulation factor is further based on an inlet NOx concentration in exhaust gas that is input to the SCR device. Further, in one or more examples, the temperature modulation factor is determined by accessing a look-up table based on the inlet temperature and the inlet NOx concentration.

In one or more examples, governing the reductant dosing in the SCR further includes determining an age modulation factor for the SCR catalyst, and adjusting the reductant dosing rate further by scaling the reductant dosing rate by the age factor. Further, in one or more examples, the age modulation factor is determined by monitoring temperature-weighted time of the SCR catalyst.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 5B depicts a block diagram of one or more modulators improving a proportional gain generated by a storage level governor, according to one or more embodiments;

DETAILED DESCRIPTION

Figure 1:
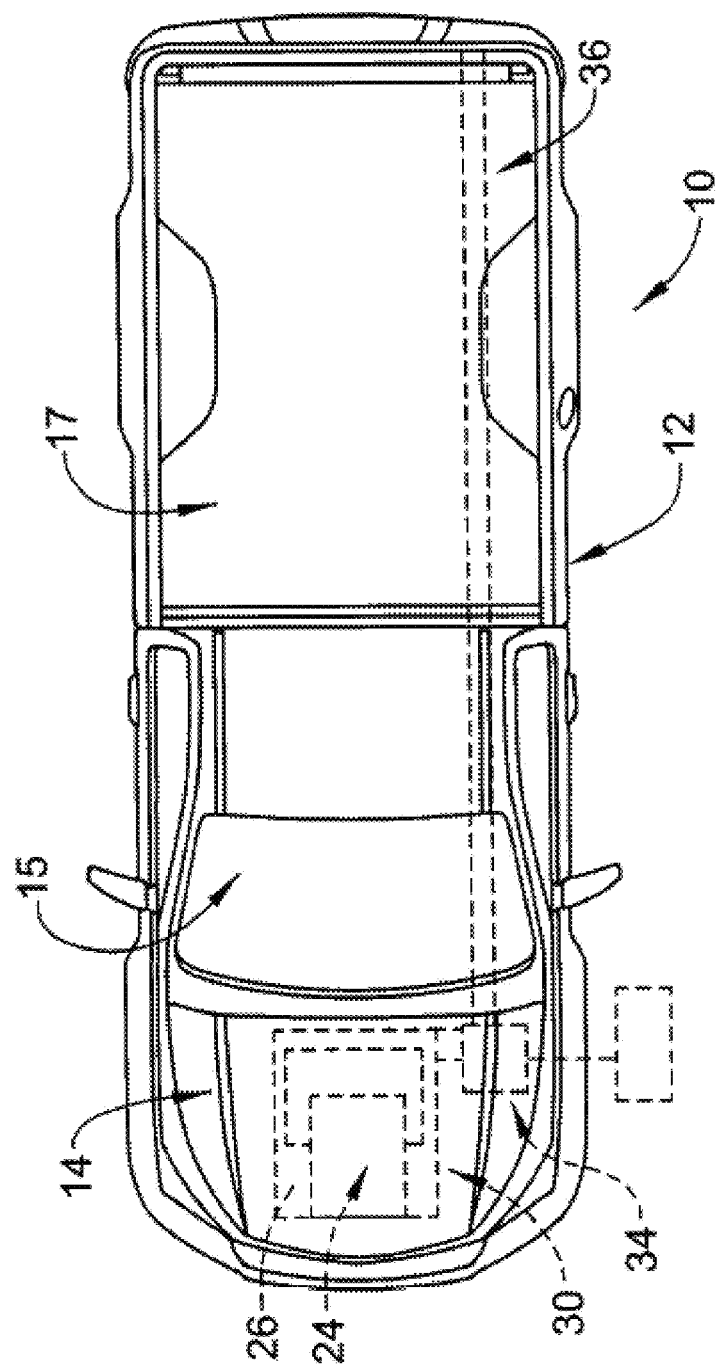
FIG. 1 depicts a motor vehicle including an internal combustion engine and an emission control system according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

A motor vehicle, in accordance with an aspect of an exemplary embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, a passenger compartment 15, and a cargo bed 17. Engine compartment 14 houses an internal combustion engine system 24, which, in the exemplary embodiment shown, may include a diesel engine 26. Internal combustion engine system 24 includes an exhaust system 30 that is fluidically connected to an aftertreatment or emissions control system 34. Exhaust produced by internal combustion engine (ICE) system 24 passes through emissions control system 34 to reduce emissions that may exit to ambient through an exhaust outlet pipe 36.

It should be noted that technical solutions described herein are germane to ICE systems that can include, but are not limited to, diesel engine systems and gasoline engine systems. The ICE system 24 can include a plurality of reciprocating pistons attached to a crankshaft, which may be operably attached to a driveline, such as a vehicle driveline, to power a vehicle (e.g., deliver tractive torque to the driveline). For example, the ICE system 24 can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore, when reference is made to a vehicle, such disclosure should be interpreted as applicable to any application of an ICE system.

Moreover, an ICE can generally represent any device capable of generating an exhaust gas stream comprising gaseous (e.g., $NO_x$, $O_2$), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE 26 can also generally represent any device capable of generating an effluent stream comprising such species. Exhaust gas particulate matter generally includes carbonaceous soot, and other solid and/or liquid carbon-containing species which are germane to ICE exhaust gas or form within an emissions control system 34.

Figure 2:
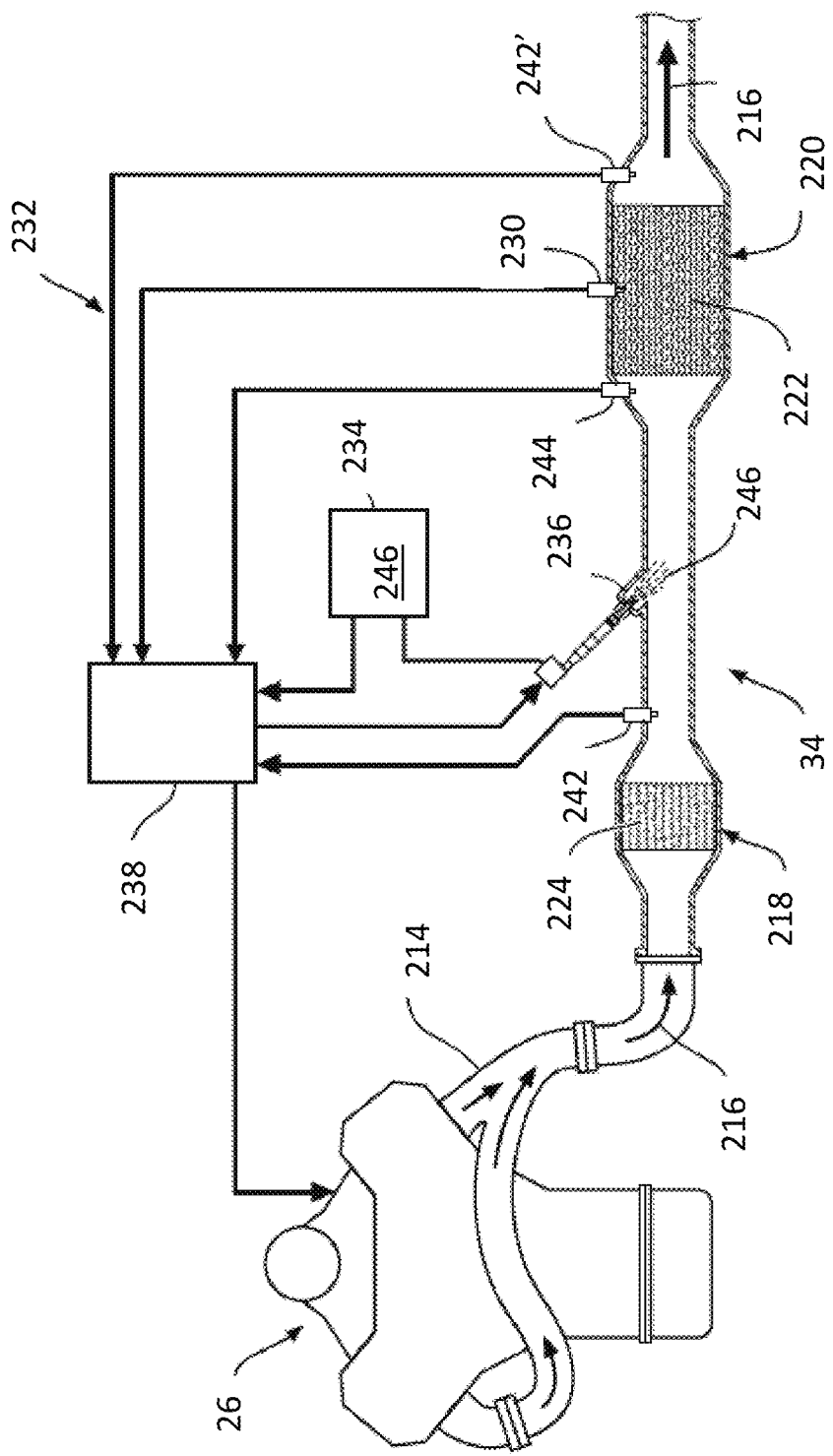
FIG. 2 illustrates example components of an emissions control system according to one or more embodiments.

FIG. 2 illustrates example components of the emissions control system 34 according to one or more embodiments. It should be noted that while the internal combustion engine system 24 includes a diesel engine 26 in the above example, the emissions control system 34 described herein can be implemented in various engine systems. The emissions control system 34 facilitates the control and monitoring of $NO_x$ storage and/or treatment materials, to control exhaust produced by the internal combustion engine system 24. For example, the technical solutions herein provide methods for controlling selective catalytic reduction (SCR) devices, and appurtenant $NO_x$ sensors, wherein the SCR Devices are configured to receive exhaust gas streams from an exhaust gas source. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. SCR Devices are configured to receive reductant, such as at variable dosing rates as will be described below.

The exhaust gas conduit 214, which may comprise several segments, transports exhaust gas 216 from the engine 26 to the various exhaust treatment devices of the emissions control system 34. For example, as illustrated, the emission control system 34 includes a SCR device 220. In one or more examples, the SCR device 220 can include a selective catalytic filter (SCRF) device, which provides the catalytic aspects of SCRs in addition to particulate filtering capabilities. Alternatively, or in addition, the SCR device 220 can also be coated on a flow through substrate. As can be appreciated, system 34 can include various additional treatment devices, including an oxidation catalyst (OC) device 218, and particulate filter devices (not shown), among others.

As can be appreciated, the OC Device 218 can be of various flow-through, oxidation catalyst devices known in the art. In various embodiments the OC device 218 may include a flow-through metal or ceramic monolith substrate 224. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC Device 218 is useful in treating unburned gaseous and non-volatile HC and CO, which are oxidized to form carbon dioxide and water. A washcoat layer includes a compositionally distinct layer of material disposed on the surface of the monolithic substrate or an underlying washcoat layer. A catalyst can contain one or more washcoat layers, and each washcoat layer can have unique chemical catalytic functions. In the SCR device 220, the catalyst compositions for the SCR function and $NH_3$ oxidation function can reside in discrete washcoat layers on the substrate or, alternatively, the compositions for the SCR and $NH_3$ oxidation functions can reside in discrete longitudinal zones on the substrate.

The SCR device 220 may be disposed downstream from the OC device 218. In one or more examples, the SCR device 220 includes a filter portion 222 that can be a wall flow filter, which is configured to remove carbon and other particulate matter from the exhaust gas 216. In at least one exemplary embodiment, the filter portion 222 is formed as a particulate filter (PF), such as a diesel particulate filter (DPF). The filter portion (i.e., the PF) may be constructed, for example, using a ceramic wall flow monolith exhaust gas filter substrate, which is packaged in a rigid, heat resistant shell or canister. The filter portion 222 has an inlet and an outlet in fluid communication with exhaust gas conduit 214 and may trap particulate matter as the exhaust gas 216 flows therethrough. It is appreciated that a ceramic wall flow monolith filter substrate is merely exemplary in nature and that the filter portion 222 may include other filter devices such as wound or packed fiber filters, open cell foams, sintered metal fibers, etc. The emissions control system 34 may also perform a regeneration process that regenerates the filter portion 222 by burning off the particulate matter trapped in the filter substrate, in one or more examples.

In one or more examples, the SCR device 220 receives reductant, such as at variable dosing rates. Reductant 246 can be supplied from a reductant supply source (not shown). In one or more examples, the reductant 246 is injected into the exhaust gas conduit 214 at a location upstream of the SCR device 220 using an injector 236, or other suitable method of delivery. The reductant 246 can be in the form of a gas, a liquid, or an aqueous solution, such as an aqueous urea solution. In one or more examples, the reductant 246 can be mixed with air in the injector 236 to aid in the dispersion of the injected spray. The catalyst containing washcoat disposed on the filter portion 222 or a flow through catalyst or a wall flow filter may reduce NOx constituents in the exhaust gas 216. The SCR device 220 utilizes the reductant 246, such as ammonia ($NH_3$), to reduce the NOx. The catalyst containing washcoat may contain a zeolite and one or more base metal components such as iron (Fe), cobalt (Co), copper (Cu), or vanadium (V), which can operate efficiently to convert NOx constituents of the exhaust gas 216 in the presence of $NH_3$. In one or more examples, a turbulator (i.e., mixer) (not shown) can also be disposed within the exhaust conduit 214 in close proximity to the injector 236 and/or the SCR device 220 to further assist in thorough mixing of reductant 246 with the exhaust gas 216 and/or even distribution throughout the SCR device 220.

The emissions control system 34 further includes a reductant delivery system 232 that introduces the reductant 246 to the exhaust gas 216. The reductant delivery system 232 includes a supply of the reductant 246, an injector 236, and a dosing governor 234. The reductant supply stores the reductant 246 and is in fluid communication with the injector 236 and the dosing governor 234. The reductant 246 may include, but is not limited to, $NH_3$. Accordingly, the injector 236 may inject a selectable amount of reductant 246 into the exhaust gas conduit 214 such that the reductant 246 is introduced to the exhaust gas 216 at a location upstream of the SCR device 220.

In one or more examples, the emissions control system 34 further includes a control module 238 operably connected via a number of sensors to monitor the engine 26 and/or the exhaust gas treatment system 34. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. For example, module 238 can execute a SCR chemical model, as described herein. The control module 238 can be operably connected to ICE system 24, SCR device 220, and/or one or more sensors. As shown, the sensors 240 can include an upstream $NO_x$ sensor 242 and downstream $NO_x$ sensor 242', disposed downstream of SCR device 220, each of which are in fluid communication with exhaust gas conduit 214. In one or more examples, the upstream NOx sensor 242 is disposed downstream of the ICE 26 and upstream of both SCR device 220 and the injector 236. The upstream $NO_x$ sensor 242 and the downstream $NO_x$ sensor 242' generate respective NOx signals proximate their location within exhaust gas conduit 214, and, which get converted to corresponding NOx levels. A NOx level can comprise a concentration, a mass flow rate, or a volumetric flow rate, in some embodiments. A NOx signal generated by a NOx sensor can be interpreted by control module 238, for example. Control module 238 can optionally be in communication with one or more temperature sensors, such as upstream temperature sensor 244, disposed upstream from SCR device 220.

The sensors of the emissions control system 34 may further include at least one pressure sensor 230 (e.g., a delta pressure sensor). The delta pressure sensor 230 may determine the pressure differential (i.e., $\Delta p$) across the SCR device 220. Although a single delta pressure sensor 230 is illustrated, it is appreciated that a plurality of pressure sensors may be used to determine the pressure differential of the SCR device 220. For example, a first pressure sensor may be disposed at the inlet of the SCR device 220 and a second pressure sensor may be disposed at the outlet of the SCR device 220. Accordingly, the difference between the pressure detected by the second delta pressure sensor and the pressure detected by the first delta pressure sensor may indicate the pressure differential across the SCR device 220. It should be noted that in other examples, the sensors can include different, additional, or fewer sensors than those illustrated/described herein.

In one or more examples, the SCR device 220 includes one or more components that utilize the reductant 246 and a catalyst to transform NO and $NO_2$ from the exhaust gases 216. The SCR device 220 can include, for example, a flow-through ceramic or metal monolith substrate that can be packaged in a shell or canister having an inlet and an outlet in fluid communication with the exhaust gas conduit 214 and optionally other exhaust treatment devices. The shell or canister can ideally comprise a substantially inert material, relative to the exhaust gas constituents, such as stainless steel. The substrate can include a SCR catalyst composition applied thereto.

The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 216. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can be a PF device, as will be discussed below.

The SCR catalyst composition is generally a porous and high surface area material which can operate efficiently to convert $NO_x$ constituents in the exhaust gas 216 in the presence of a reductant 246, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ-13. Suitable SCR catalyst compositions can have high thermal structural stability, particularly when used in tandem with particulate filter (PF) devices or when incorporated into SCRF devices, which are regenerated via high temperature exhaust soot burning techniques.

The SCR catalyst composition can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The SCR catalyst generally uses the reductant 246 to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant 246 can be ammonia ($NH_3$), such as anhydrous ammonia or aqueous ammonia, or generated from a nitrogen and hydrogen rich substance such as urea ($CO(NH_2)_2$). Additionally or alternatively, the reductant 246 can be any compound capable of decomposing or reacting in the presence of exhaust gas 216 and/or heat to form ammonia. Equations (1)-(5) provide exemplary chemical reactions for $NO_x$ reduction involving ammonia.

$$6NO+4NH_3 \rightarrow 5N_2+6H_2O \qquad (1)$$

$$4NO+4NH_3+O_2 \rightarrow 4N_2+6H_2O \qquad (2)$$

$$6NO_2+8NH3 \rightarrow 7N_2+12H_2O \qquad (3)$$

$$2NO_2+4NH_3+O_2 \rightarrow 3N_2+6H_2O \qquad (4)$$

$$NO+NO_2+2NH_3 \rightarrow 2N_2+3H_2O \qquad (5)$$

It should be appreciated that Equations (1)-(5) are merely illustrative, and are not meant to confine the SCR device 220 to a particular NOx reduction mechanism or mechanisms, nor preclude the operation of other mechanisms. The SCR device 220 can be configured to perform any one of the above NOx reduction reactions, combinations of the above NOx reduction reactions, and other NOx reduction reactions.

The reductant 246 can be diluted with water in various implementations. In implementations where the reductant 246 is diluted with water, heat (e.g., from the exhaust) evaporates the water, and ammonia is supplied to the SCR device 220. Non-ammonia reductants can be used as a full or partial alternative to ammonia as desired. In implementations where the reductant 245 includes urea, the urea reacts with the exhaust to produce ammonia, and ammonia is supplied to the SCR device 220. Reaction (6) below provides an exemplary chemical reaction of ammonia production via urea decomposition.

$$CO(NH_2)_2+H_2O \rightarrow 2NH_3+CO_2 \qquad (6)$$

It should be appreciated that Equation (6) is merely illustrative, and is not meant to confine the urea or other reductant 246 decomposition to a particular single mechanism, nor preclude the operation of other mechanisms.

The SCR catalyst can store (i.e., absorb, and/or adsorb) reductant for interaction with exhaust gas 216. For example, the reductant 246 can be stored within the SCR device 220 or catalyst as ammonia. A given SCR device 220 has a reductant capacity, or an amount of reductant or reductant derivative it is capable of storing. The amount of reductant stored within an SCR device 220 relative to the SCR catalyst capacity can be referred to as the SCR "reductant loading", and can be indicated as a % loading (e.g., 90% reductant loading) in some instances. During operation of SCR device 220, injected reductant 246 is stored in the SCR catalyst and consumed during reduction reactions with NOx species and must be continually replenished. Determining the precise amount of reductant 246 to inject is critical to maintaining exhaust gas emissions at acceptable levels: insufficient reductant levels within the system 34 (e.g., within SCR device 220) can result in undesirable NOx species emissions ("NOx breakthrough") from the system (e.g., via a vehicle tailpipe), while excessive reductant 246 injection can result in undesirable amounts of reductant 246 passing through the SCR device 220 unreacted or exiting the SCR device 220 as an undesired reaction product ("reductant slip"). Reductant slip and NOx breakthrough can also occur when the SCR catalyst is below a "light-off" temperature. SCR dosing logic can be utilized to command reductant 246 dosing, and adaptations thereof, and can be implemented by module 238, for example.

A reductant injection dosing rate (e.g., grams per second) can be determined by a SCR chemical model which predicts the amount of reductant 246 stored in the SCR device 220 based on signals from one or more of reductant 246 injection (e.g., feedback from injector 236) and upstream NOx (e.g., NOx signal from upstream NOx sensor 242). The SCR chemical model further predicts NOx levels of exhaust gas 216 discharged from the SCR device 220. The SCR chemical model can be implemented by control module 238. The SCR chemical model can be updatable by one or more process values over time, for example. The dosing governor 234, which is controlled by module 238 in one or more examples, monitors the reductant storage level predicted by the SCR chemical model, and compares the same to a desired reductant storage level. Deviations between the predicted reductant storage level and the desired reductant storage level can be continuously monitored and a dosing adaptation can be triggered to increase or decrease reductant dosing in order to eliminate or reduce the deviation. For example, the reductant dosing rate can be adapted to achieve a desired $NO_x$ concentration or flow rate in the exhaust gas 216 downstream of the SCR device 220, or achieve a desired $NO_x$ conversion rate. A desired conversion rate can be determined by many factors, such as the characteristics of SCR catalyst type and/or operating conditions of the system (e.g., ICE 26 operating parameters).

In one or more examples, the dosing governor 234 implements the reductant (e.g. urea) dosing control strategy and is used to achieve the maximum NOx conversion (reduce NOx breakthrough) without having excessive NH3 slip from the SCR device 220. During storage based dosing control, the storage level governor 440 determines a corrective dosing quantity to achieve the $NH_3$ storage setpoint, based on the deviation of the NH3 storage setpoint to the estimated NH3 storage on the SCR device 220.

Figure 3:
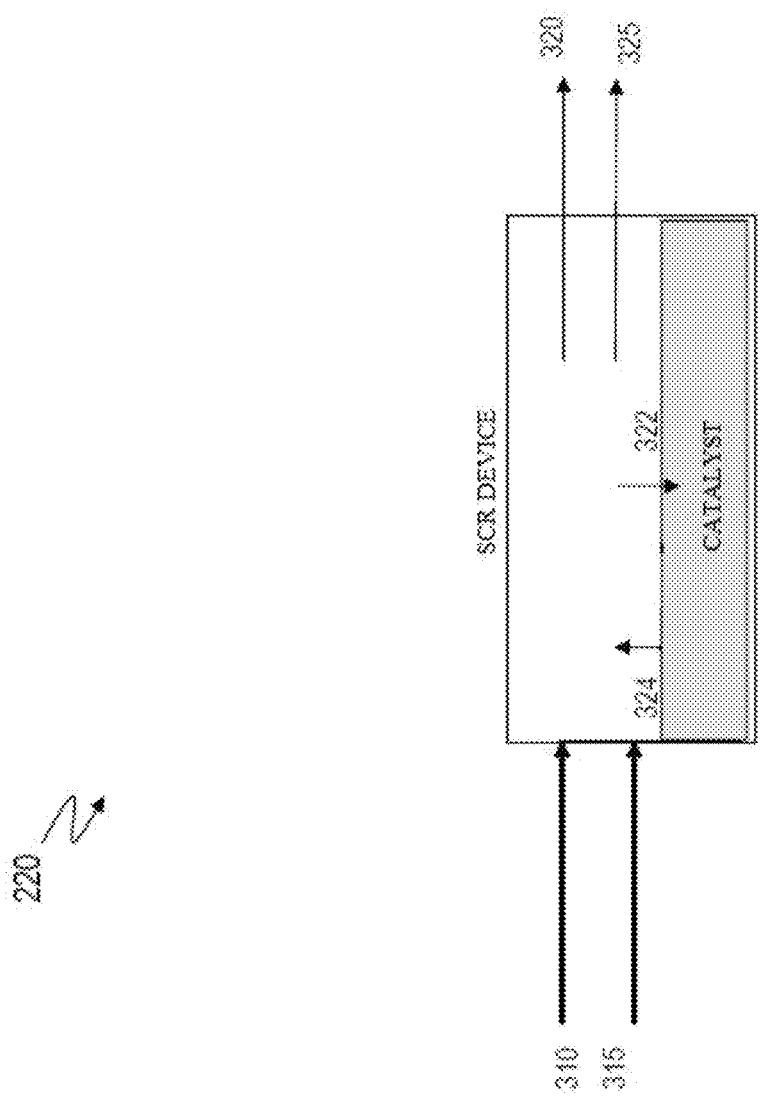
FIG. 3 illustrates an example flow of the gases through an SCR device, according to one or more embodiments.

FIG. 3 illustrates an example flow of the gas exhaust through the SCR device 220, according to one or more embodiments. The control module 238 measures the flow rate (F) of gas volume, and concentration C of the gas. For example, the SCR device 220 determines an input flow-rate of NOx 310 as $FC_{NOx,in}$, where F is the volume of the incoming gas 216, and $C_{NOx,in}$ is the inlet concentration of NOx in the incoming gas 216. Similarly, $FC_{NH3,in}$ is the volume of the flow-rate of $NH_3$ 315 in the incoming gas 216, $C_{NH3,in}$ being the inlet concentration of $NH_3$. Further, compensating for the amount of adsorption 322 and amount of desorption 324, and the amounts reacted on the catalyst surface, the control module 238 may determine $C_{NH3}$ as the SCR concentration of NH3, and $C_{NOx}$ as SCR concentration of NOx.

Accordingly, $FC_{NOx}$ is the NOx outlet volume flow rate 320 of $NO_x$ through the outlet of the SCR device 220. In one or more examples, the control module 238 may determine $W_{NOx}FC_{NOx}$ as mass flow rate of NOx, where $W_{NOx}$ is the molecular weight of NOx. Similarly, for $NH_3$, the outlet volume flow rate 325 is $FC_{NH3}$ with the mass flow rate of NH3 being $W_{NH3}FC_{NH3}$.

As described earlier, the control module 238, via the dosing governor 234, controls the reductant injection rate precisely; such as ammonia producing urea aqueous solution injection rate. An insufficient injection may result in unacceptably low NOx conversions. An injection rate that is too high results in release of ammonia to the atmosphere. These ammonia emissions from SCR systems are known as ammonia slip.

Figure 4:
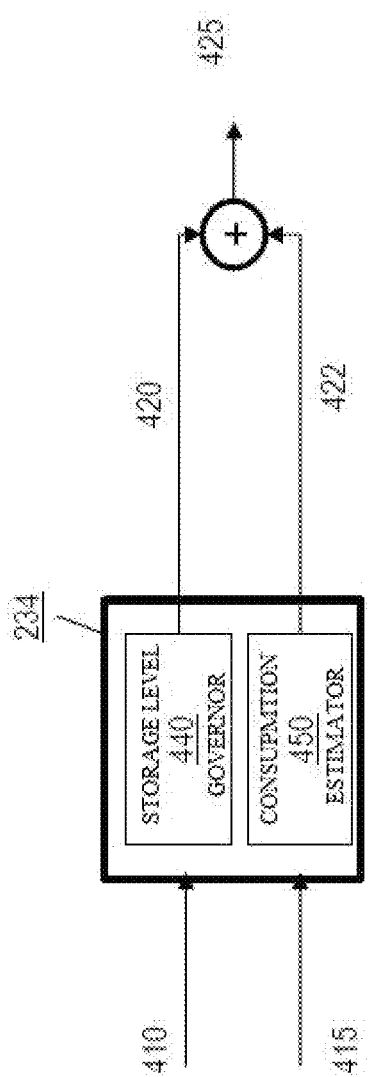
FIG. 4 depicts an example dosing governor according to one or more embodiments.

Accordingly, referring to FIG. 2 and FIG. 4, the control module 238 controls operation of the injector 236 based on the estimate from the consumption estimator 450 and desired $NH_3$ storage setpoint from the storage governor 440 to determine an amount of reductant 246 to be injected as described herein. The SCR catalyst adsorbs (i.e., stores) $NH_3$. The amount of $NH_3$ stored by the SCR device 220 may be referred to hereinafter as an "NH3 storage level." The control module 238 may control the amount of $NH_3$ supplied to the SCR device 220 to regulate the $NH_3$ storage level. $NH_3$ stored in the SCR device 220 reacts with NOx in the exhaust gas 216 passing therethrough.

In one or more examples, the percentage of NOx that is removed from the exhaust gas 216 entering the SCR device 220 may be referred to as a conversion efficiency of the SCR device 220. The control module 238 may determine the conversion efficiency of the SCR device 220 based on $NOx_{in}$ and $NOx_{out}$ signals generated by the first (upstream) NOx sensor 242 and second (downstream) NOx sensor 242' respectively. For example, the control module 238 may determine the conversion efficiency of the SCR device 220 based on the following equation:

$$SCR_{eff}=(NOx_{in}-NOx_{out})/NOx_{in} \quad (7)$$

$NH_3$ slip can also be caused because of an increase in the temperature of the SCR catalyst. For example, NH may desorb from the SCR catalyst when the temperature increases at times when the $NH_3$ storage level is near to the maximum $NH_3$ storage level. $NH_3$ slip may also occur due to an error (e.g., storage level estimation error) or faulty component (e.g., faulty injector) in the emissions control system 34.

Typically, the control module 238 estimates an $NH_3$ storage level of the SCR device 220 based on the chemical model. In one or more examples, the $NH_3$ storage set-point ("set-point") is calibrate-able. The control module 238 uses the chemical model to estimate the current storage level of $NH_3$ in the SCR device 220, and the dosing governor 234 provides feedback to the injection controls to determine the injection rate to provide $NH_3$ for reactions according to the chemical model and to maintain a target storage level. The set-point may indicate a target storage level "S". The control module 238 controls the reductant injector 236 to manage the amount of reducing agent injected into the exhaust gas 216 to adjust the storage level of the SCR device 220 to the set-point. For example, the control module 238 commands the injector 236 to increase or decrease the storage level to reach the set-point when a new set-point is determined. Additionally, the control module 238 commands the reductant injector 236 to increase or decrease the storage level to maintain the set-point when the set-point has been reached.

FIG. 4 depicts an example storage level governor according to one or more embodiments. The dosing governor 234 includes the storage level governor 440 and the NH3 consumption estimator 450. The consumption estimator 450 estimates 422 an amount of NH3 that the SCR device 220 consumes according to the chemical model. In addition, the storage level governor 440 provides a desired level of NH3 stored in the SCR device 220. The dosing governor 234 adds the outputs from both, the storage level governor 440 and the consumption estimator 450 to determine a desired amount 425 of NH3 in the SCR device 220, and subsequently to determine an amount of NH3 to inject to satisfy the desired level 425.

In one or more examples, the storage level governor 440 is a proportional controller that receives the NH3 storage level deviation 410 between the predicted storage level according to the chemical model, and a desired NH3 level to prevent NH3 slip (and/or NOx breakout). The storage level governor 440 further receives a flowrate 415 of exhaust gas 216 entering the SCR device 220, such as in grams/second, or any other units. Based on these inputs the proportional controller, typically computes a proportional gain 420 to adjust the storage level "S" of the SCR device 220. It should be noted that the dosing governor 234 may receive additional input signals than those depicted in FIG. 4, for example exhaust constituents, and other physical parameters of the exhaust system that may be used by the consumption estimator 450.

Table 1 depicts an example look-up table used by the storage level governor 440 to determine the proportional gain 420 based on the storage deviation 410 and the exhaust gas flowrate 415. The look-up table includes predetermined values to be used as proportional gain 420 for specific values of the inputs. The storage level governor 440 interpolates between the values from the loop-up table in case the input values are within specific ranges in the predetermined input values in the table. It should be noted that the table illustrated by Table 1 is one example, and that in other embodiments, different tables can be used. Further yet, in other examples, the storage level governor 440, instead of using a look-up table, computes the proportional gain 420 based on a function using the input values.

TABLE 1

| Storage | Exhaust Gas Flowrate | | | | | | | |
|---|---|---|---|---|---|---|---|---|
| Deviation | 10 | 30 | 50 | 70 | 90 | 120 | 170 | 200 |
| −0.25 | −250 | −250 | −250 | −250 | −250 | −250 | −250 | −250 |
| −0.01 | −10 | −10 | −10 | −10 | −10 | −10 | −10 | −10 |
| 0.00 | −5 | −5 | −5 | −5 | −5 | −5 | −5 | −5 |
| 0.00 | 0 | 0 | 0 | 0 | 0 | 0 | 0 | 0 |
| 0.02 | 4 | 4 | 4 | 5 | 7 | 10 | 14 | 14 |
| 0.10 | 8 | 8 | 12 | 15 | 19 | 23 | 28 | 28 |
| 0.30 | 12 | 12 | 16 | 20 | 31 | 34 | 37 | 37 |
| 0.75 | 21 | 21 | 26 | 28 | 38 | 40 | 41 | 41 |
| 1.00 | 23 | 23 | 29 | 35 | 40 | 41 | 43 | 43 |
| 1.50 | 24 | 24 | 30 | 36 | 41 | 42 | 43 | 43 |
| 2.00 | 25 | 25 | 31 | 37 | 41 | 42 | 43 | 43 |

In one or more examples, the control module 238 uses the chemical model of the SCR catalyst to predict the NOx concentration in the exhaust gases 216 entering the SCR device 220. Further, based on the predicted NOx concentration, the control module 238 determines an amount of $NH_3$ with which to dose the exhaust gases 216 to satisfy the emissions threshold. The control module 238 typically implements an adaptive closed loop/semi-closed loop control strategy to maintain SCR performance according to the chemical model, where the control module continuously learns one or more parameters associated with the chemical model according to the ongoing performance of the motor vehicle 10. However, a technical challenge for an exhaust system using an adaptive control strategy is that the storage level governor 440 does not take into account that the ammonia storage capacity of the SCR catalyst varies according to factors, such as temperature, age of the catalyst, and engine out NOx concentration. The technical solutions described herein address such technical challenges by adding modulators to optimize the storage level governor 440 response for high/low temperature, fresh/aged SCR, or high/low engine out NOx. In one or more examples, the technical solutions described herein facilitate improving the proportional gain 440 by scaling the proportional gain 420 based on the one or more factors.

Figure 5A:
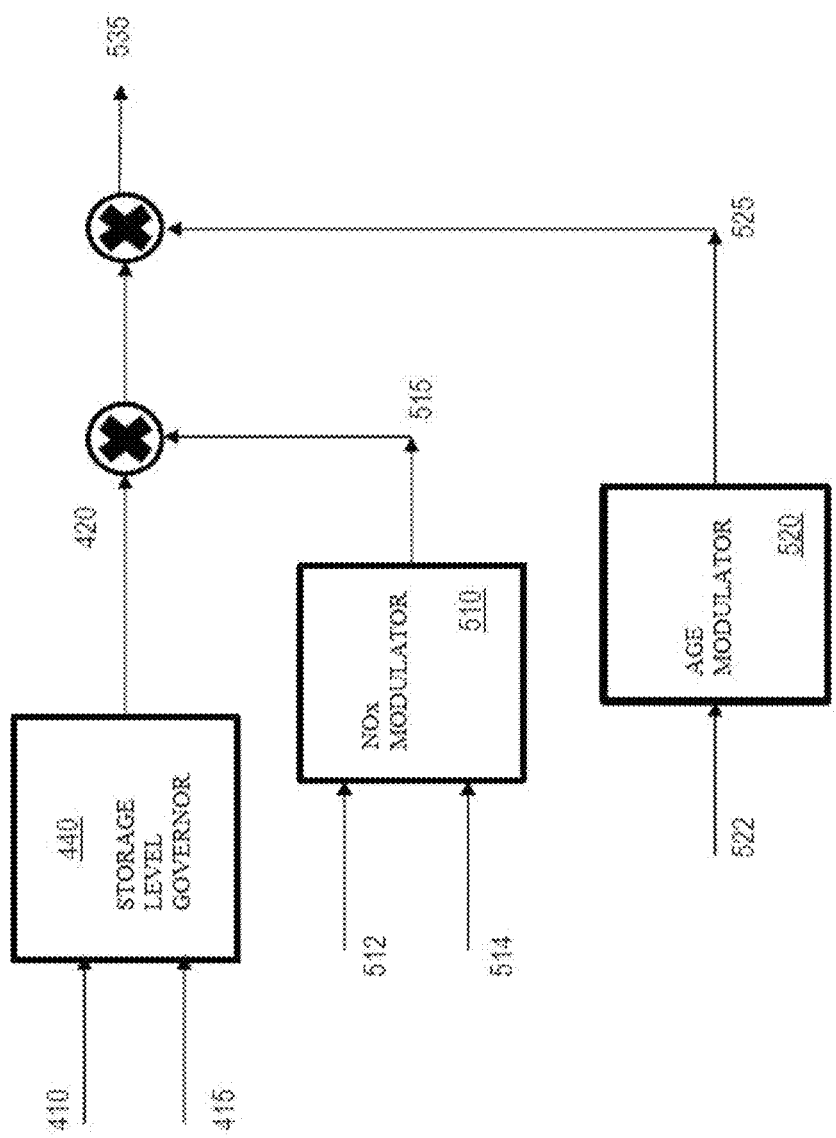
FIG. 5A depicts a block diagram of one or more modulators improving a proportional gain generated by a storage level governor, according to one or more embodiments.

FIG. 5A depicts a block diagram of one or more modulators improving the proportional gain 420 generated by the storage level governor 440, according to one or more embodiments. For example, FIG. 5A depicts a temperature and inlet NOx modulator 510 that generates a temperature modulation factor 515, which is a first scaling factor. Further, an age modulator 520 generates an age modulation factor 525, which is a second scaling factor. The modulation factors 515, 525 are multiplied with the proportional gain 420 computed by the storage level governor 440 to generate a governor gain 535.

A modulator in the one or more embodiments is an electronic circuit, such as an integrated circuit, application specific integrated circuit (ASIC) or the like. In other examples, the modulator includes hardware components such as a field programmable gate array (FPGA), or the like. Further yet, in one or more examples, the modulator includes one or more computer executable instructions stored on a memory device that are read and executed by a processor, such as the control module 238. Alternatively, or in addition, the modulator, in one or more examples, is a separate processor.

The temperature and inlet NOx modulator 510 facilitates modulating the desired storage buildup rate with respect to temperature measured at the SCR catalyst 512. In one or more examples, the temperature 512 is measured using one or more of the temperature sensors, such as the upstream temperature sensor 244. The modulation provided by the modulator 510 addresses the technical challenge that the SCR catalyst is more tolerant of a faster storage buildup and stores slight excess NH3 at lower temperatures (e.g.: at 250 deg C.) compared to higher temperatures (e.g.: at 350 deg C.).

In one or more examples, temperature and inlet NOx modulator 510 receives the inlet temperature 512 of the SCR device 220. The upstream temperature sensor 244 monitors the inlet temperature 512. Alternatively, or in addition, the temperature and inlet NOx modulator 510 receives the inlet NOx concentration 514 as input. The upstream NOx sensor 242 measures the inlet NOx concentration 514 in the exhaust gases 216.

The temperature modulator 510 facilitates adapting the dosing rate of the reductant according to the inlet temperature 512 because the reductant storage capacity of the SCR catalyst changes according to the temperature. For example, the SCR catalyst can have a lower storage capacity (e.g. 7% lower or any other) above 400 deg C. compared to below that temperature. Accordingly, the temperature modulator 510 modulates the storage governor response at 400 deg C. and beyond. It should be noted that the 400 deg C. is an example, and that in other examples, the temperature range at which the temperature modulation is performed can be different in other examples. Additionally, in one or more examples, the temperature modulation threshold-temperature above (or below) which the modulation is performed is configurable. Thus, products that have different duty cycle temperature profiles, can use the temperature modulator to improve storage based dosing control by configuring the threshold-temperature. Alternatively, or in addition, the temperature modulation optimizes different emission cycles for the same application. Further yet, in one or more examples, at higher temperature say 350 deg C., storage governor response is modulated to provide uniform dosing for a longer interval vs. short burst of dosing.

The temperature and inlet NOx modulator 510 further modulates the governor output based on inlet NOx concentration 514. The total NOx flow (=j (NOx ppm, exhaust gas flowrate)) determines the SCR catalyst's ability to consume incoming reductant (part of which is commanded by storage governor and the rest from chemical model). The engine out NOx varies over a wide range, for example from 100 ppm to 1200 ppm, along with space velocity variation. Thus, the inlet NOx concentration based modulation facilitates optimizing the storage level governor's 440 performance for the variable NOx over different cycles and applications.

In one or more examples, the temperature and inlet NOx modulator 510 determines the modulation factor 515 using the inlet temperature 512 and the inlet NOx concentration 514. For example, the modulator 510 accesses a look-up table, such as depicted in Table 2 and determines the modulating factor 515 for the predetermined values in the look-up table. In case the measured inlet temperature 512 and/or the inlet NOx concentration 514 values are not among the predetermined values in the table, the modulating factor 510 is determined by interpolating the values from the table. It should be noted that the values in table 2 are examples, and that in other examples, the look-up table used for determining the modulation factor 515 can have different values. Further yet, it should be noted that in other examples, instead of a look-up table, the temperature and inlet NOx modulator 510 computes the modulation factor 515 dynamically in real time based on a function that is stored in the form of computer executable instructions.

TABLE 2

| Temperature>><br>Inlet NOx | 175 | . . . | 400 |
|---|---|---|---|
| Min NOx ppm for the application | | | |
| . . . | | | |
| Max NOx ppm | | | |

Figure 6:
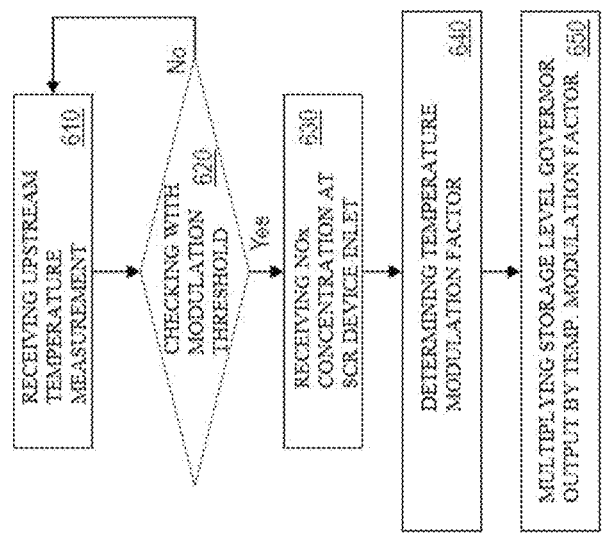
FIG. 6 illustrates a flowchart of an example method for modulating the output of a storage level governor with a temperature modulation factor according to one or more embodiments.

FIG. 6 illustrates a flowchart of an example method 600 for modulating the output of the storage level governor 440 with a temperature modulation factor 515 according to one or more embodiments. The method includes receiving upstream temperature measurement from the upstream temperature sensor 244, as shown at 610. The upstream temperature measurement indicates the temperature at the inlet of the SCR device 220. Further, the temperature value is checked with the modulation temperature-threshold, as shown at 620. If the inlet temperature does not exceed the temperature-threshold, the output of the storage level governor 440 is unchanged, in one or more examples. If the temperature-threshold is exceeded (or equaled), the method 600 further includes receiving the NOx concentration at the inlet of the SCR device 220, as shown at 630. The inlet NOx concentration is determined using the upstream NOx sensor 242.

The method 600 further includes determining the temperature modulation factor 515 from the inputs, temperature and NOx concentration, for example, using the look-up table, as shown at 640. The output of the storage level governor 440, that is the proportional gain 420 is multiplied by the temperature modulation factor 515, as shown at 650. The output of the storage level governor 440 is thus adjusted, and in turn the reductant dosing rate is adjusted according to the upstream temperature and NOx concentration in the exhaust system.

The method 600 thus facilitates reducing and/or preventing NH3 slip caused by overdosing the SCR device 220 as the temperature rises. For example, as the temperature increases the storage capacity of the SCR catalyst decreases. Hence, if a constant reductant dosing rate is used, excess NH3 that is left at higher temperatures (because of reduced storage capacity of the catalyst) can escape leading to NH3 slip. By scaling the reductant dosing rate based on the temperature thus facilitates reducing/preventing such NH3 slip.

Further, the NOx coming into the SCR device 220 does not change the storage capacity of the SCR catalyst, rather the NH3 consumed during the SCR. For example, at a specific temperature, if the NOx concentration is 200 parts per million (ppm), consider that X gms of the NH3 is consumed as reductant during the SCR, for the exhaust system 24 to convert the NOx into nitrogen and water. If at the same specific temperature, the inlet NOx concentration increases (or decreases) the NH3 consumed for the SCR changes accordingly. Hence, to replenish the amount of NH3 stored in the SCR catalyst, a different amount of reductant is injected, by the method 600.

Referring back to FIG. 5A, the age modulator 520 adjusts the proportional gain 420 output from the storage level governor 440 based on an age of the SCR catalyst of the SCR device 220. For example, an aged SCR 220 is less tolerant of aggressive governor action than a fresh SCR device 220. For example, as the SCR catalyst ages, the pores may coalesce or get destroyed, reducing the surface area available for the reductant storage, and in turn reducing the reductant storage capacity. Accordingly, if the dosing factor is not changed, excess reductant, which cannot be absorbed by an aged SCR catalyst may lead to NH3 slip. The age modulator 520 addresses the technical problem of the NH3 slip caused by the aging of the SCR catalyst. In one or more examples, the age modulator 520 uses a mathematical model to determine an aging factor corresponding to the SCR catalyst, which, in turn, is used as or is used to determine the aging modulation factor 525. The modulation factor 525 is further used to modify the storage level governor output and in turn the reductant dosing rate.

In one or more examples, the model calculates the aging of the SCR catalyst based on the time spent by the catalyst at a particular temperature. The thermal stress is directly affected by the temperature: the higher the temperature, the higher the thermal stress. An aging factor is assigned to each temperature window (through a calibratable map) in order to identify the impact of the aging in that particular temperature range. For example, low temperature means lower impact on the aging.

In one or more examples, the aging factor is normalized based on the aging effect at the maximum catalyst temperature, which is a predetermined value. The calculation takes into account the time spent by the catalyst in each of a predetermined set of temperature windows and calculates the cumulative aging of the component. Based on the cumulative aging, a corresponding age modulation factor is selected from a look-up table, to be used to modify the storage level governor output for the dosing control. Table 3 depicts an example age modulation factor look-up table. In the example look-up table, a age factor of 0 represents a fresh SCR device 220, and as the age factor value increases, older is the SCR device 220. As the SCR device 220 gets older, the storage capacity of the SCR catalyst reduces, and hence dosing amount of the reductant is reduced by scaling down the storage level governor output accordingly.

TABLE 3

| | Age Factor | | | | | |
|---|---|---|---|---|---|---|
| | 0.0 | 0.2 | ... | ... | ... | 1.0 |
| Storage Governor Modulation Factor | 1 | ... | ... | ... | ... | <1 |

Figure 7:
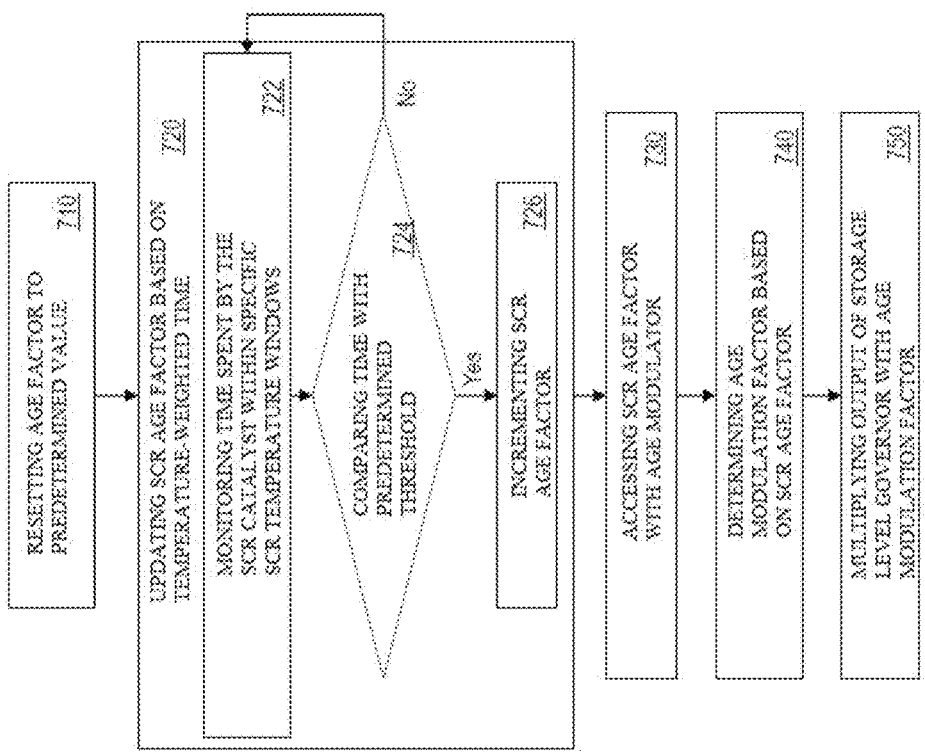
FIG. 7 illustrates a flowchart of an example method for determining an age modulation factor according to one or more embodiments.

FIG. 7 illustrates a flowchart of an example method 700 for determining the age modulation factor 525 according to one or more embodiments. At the outset, when the SCR device 220 is new, an SCR age factor associated with the SCR device 220 is set to a predetermined value for a new SCR device, such as 0, as shown at 710. In one or more examples, if the SCR device 220, or the SCR catalyst is replaced, the SCR age factor is reset to the predetermined value, as shown at 710.

Further, the SCR age factor is continuously updated based on temperature-weighted time, that is time spent by the SCR catalyst within specific temperature ranges, as shown at 720. Updating the age factor includes monitoring time spent by the SCR catalyst within specific SCR temperature windows, as shown at 722. In one or more examples, the control module 238 keeps track of the time duration within specific temperature windows. The temperature windows are predetermined temperature ranges, for example, 300 deg C. and below, 301-350 deg C., 351-400 deg C., 400-425 deg C., 426-450 deg C. and 451 deg C. and above. It should be noted that the ranges above are exemplary, and that in other implementations different, additional, or fewer temperature ranges are used. The temperature ranges are determined based on type of activity that causes the SCR device 220 to be in those specific temperature ranges. For example, if the vehicle is being used off-road, on inclines, or the like, the SCR device 220 is used more than being operated in steady-state (constant load), which can cause the temperature to be higher in the former case than the latter.

In one or more examples, the control module 238 maintains a running count of the amount of time spent by the SCR device 220 at the predetermined temperature windows. In one or more examples, if the time spent at a particular temperature window is compared with a predetermined threshold associated with that temperature window, as shown at 724. For example, a first predetermined threshold of a first temperature window is 30 minutes, a second predetermined threshold of a second temperature window is 25 minutes, a third predetermined threshold of a third temperature window is 15 minutes, and so on. In this example scenario, an amount of time spent at a lower temperature affects the age factor similar to relatively lesser amount of time at a higher temperature, because at higher temperature the SCR catalyst may deteriorate faster. Because the temperature windows are configurable, the weighting factors can be varied depending on application, vehicle, SCR device, SCR catalyst, or any other factors. It should be noted that the above values for the predetermined thresholds for the time spent are examples, and that in other implementations, different values can be used.

The control module 238 keeps monitoring and incrementing the time spent in each temperature window based on the temperature values of the SCR device 220, until one of the predetermined thresholds associated with a corresponding temperature window is met or exceeded, as shown at 724 and 722. If the threshold is met or exceeded, the SCR age factor of the SCR device 220 is incremented, as shown at 726. For example, the age factor is incremented by a predetermined value, such as 1, 0.1, or any other predetermined value.

During the modulation of the storage level governor's 440 output, the age modulator 520 accesses the SCR age factor, as shown at 730. In one or more examples, the age modulator 520 receives the age factor from the control module 238 or another module of the control module 238. Alternatively, or in addition, the age modulator 520 accesses the age factor from a memory device of the control module 238. The age modulator 520 further determines the age modulation factor 525 based on the SCR age factor, as shown at 740. For example, the age modulator 520 uses a look-up table (described herein) to determine a predetermined value for the age modulation factor 525 based on the SCR age factor. In one or more examples, if the SCR age factor does not match one of the predetermined values in the look-up table, the age modulator 520 interpolates the values from the look-up table to determine the age modulation factor 525 based on the SCR age factor.

Further, the output of storage level governor 440 is multiplied with the age modulation factor, as shown at 750. In case the age factor modulator 520 is used in addition to the temperature and inlet NOx modulator 510, the output from the storage level governor 440 is multiplied by the temperature modulation factor 515 and by the age modulation factor 525. In such cases, the governor gain 535 can be expressed as—

Governor Gain=Proportional Gain×Temperature Modulation Factor(Input=SCR Temp,SCR Inlet NOx)×Age Modulation Factor(Input=Age Factor).

It should be noted that in one or more examples, only one of the temperature and inlet NOx modulator 510 and the age modulator 520 is used.

FIG. 5B depicts a block diagram of one or more modulators improving the proportional gain 420 generated by the storage level governor 440, according to one or more embodiments. For example, FIG. 5B depicts the temperature modulator 510 that generates the temperature modulation factor 515, the age modulator 520 that generates the age modulation factor 525, and in addition an inlet NOx modulator 550 that generates an inlet NOx modulation factor 555, which is a third modulation factor. The modulation factors 515, 525, and 555 are multiplied with the proportional gain 420 computed by the storage level governor 440 to generate the governor gain 535. In this case, instead of using the temperature modulation factor 515 based on the upstream temperature 512 and upstream NOx 514, the temperature modulator 510 determines the temperature modulation factor 515 based on the upstream temperature 512 and the NH3 storage deviation 410. The upstream NOx concentration 514 is further used, in conjunction with the NH3 storage deviation 410, to determine the inlet NOx modulation factor. In a manner similar to the example of FIG. 5A, the age modulator 520 determines the age modulation factor 525 based on the SCR age factor 522 and the NH3 storage deviation 410.

Table 4 depicts an example look-up table structure for the temperature modulator 510, age modulator 520, and the inlet NOx modulator 550 to determine the respective modulation factors based on the input signals. It should be noted that in one or more examples, the technical solutions use multiple tables for each respective factor, the tables using the depicted structure. Based on the NH3 storage deviation 410 and the corresponding input, each of the modulators, the temperature modulator 510, age modulator 520, and the inlet NOx modulator 550, determine the corresponding modulator factor that is subsequently used to scale the governor gain 420.

TABLE 4

Temp/NOx/Age Modulator Table Structure
SCR inlet temp (deg C. or K)/Inlet NOx (ppm)/SCR Aging Factor
(0 . . . 1)

|  |  | X | Y | . . . |
|---|---|---|---|---|
| NH3 Storage Deviation | −0.2 |  |  |  |
|  | 0.0 |  |  |  |
|  | . . . |  |  |  |
|  | +0.2 |  |  |  |

Figure 8:
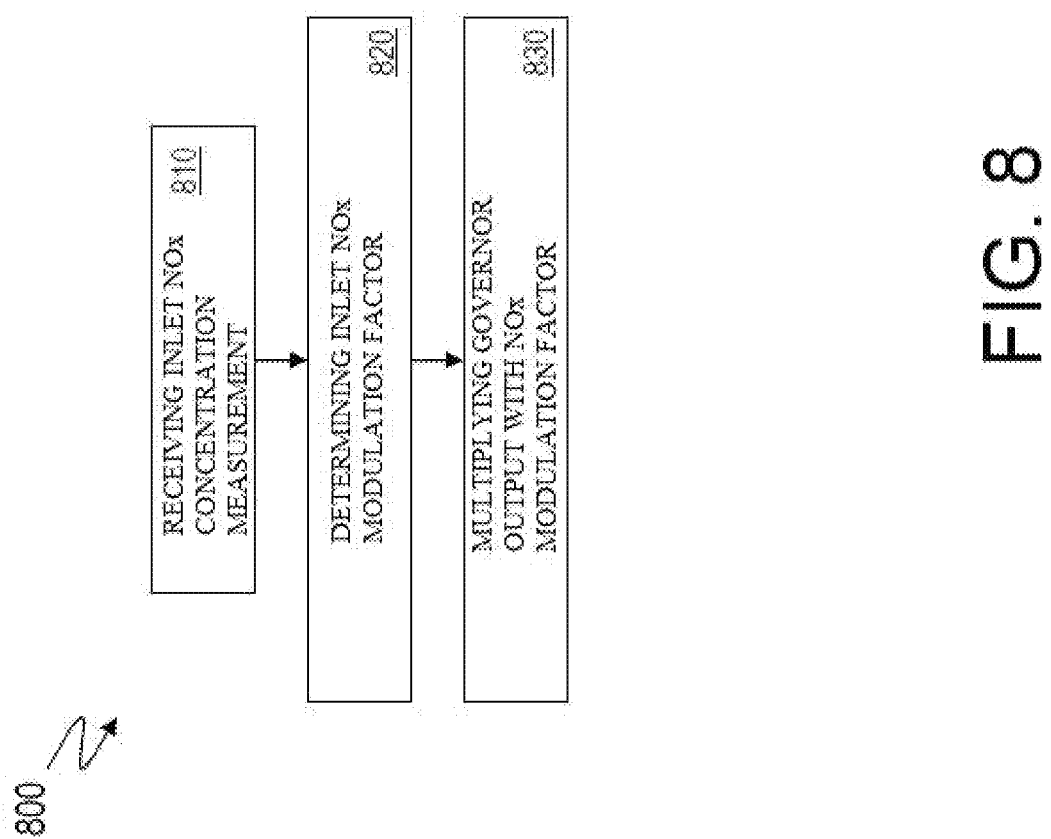
FIG. 8 illustrates a flowchart of an example method for determining an inlet NOx modulation factor according to one or more embodiments.

FIG. 8 depicts a flowchart of an example method 800 for scaling the governor gain using an inlet NOx modulation factor 555 according to one or more embodiments. In one or more examples, the inlet NOx modulator 550 implements the method to determine the inlet NOx modulation factor 555. The method includes receiving an inlet NOx concentration measurement, as shown at 810. The NOx concentration measurement is based on an NOx signal from the upstream NOx sensor 242'. The method further includes determining the inlet NOx modulation factor 555, for example using a look-up table, such as structured as shown by Table 4, as shown at 820. For example, the inlet NOx modulator 550 uses the NH3 storage deviation 410 and the upstream NOx measurement to determine the inlet NOx modulation factor 555. The method further includes multiplying the governor output 420 with the NOx modulation factor 555, as shown at 830.

In case the inlet NOx modulator 550 is used in addition to the temperature modulator 510, and the age modulator 520, the output from the storage level governor 440 is multiplied by the temperature modulation factor 515, the age modulation factor 525, and the inlet NOx modulation factor 555. In such cases, the governor gain 535 can be expressed as—

Governor Gain=Proportional Gain×Temperature
Modulation Factor(Input=SCR Temp,)×Age
Modulation Factor(Input=Age Factor)×Inlet
NOx Modulation Factor(Input=SCR inlet NOx).

It should be noted that in one or more examples, only one of the temperature and inlet NOx modulator 510 and the age modulator 520 is used.

The technical solutions described herein facilitate improvements to emissions control systems used in combustion engines, such as those used in vehicles. For example, the technical solutions determine adjustment factors to optimize storage level governor response under varying engine operating conditions and account for SCR catalyst age. The technical solutions thus facilitate the emissions control system to maintain the combustion engine in compliance with differing requirements by facilitating the emissions control system to be configurable with respect to one or more operating conditions of the SCR device, such as temperature, NOx concentration, and SCR device/catalyst age.

Generally, the storage governor output (gain term) is a function of exhaust mass flow (surrogate for space velocity of the SCR catalyst) and storage error. However the NH3 storage capacity of the SCR catalyst depends on temperature and age of the catalyst. The SCR catalyst is more forgiving of excess storage or under-storage condition when it is fresh and at peak efficiency temperature (250-350 deg c) while still maintaining tail pipe NOx emission at an acceptable level. However as the SCR device goes through aging and/or when the SCR device is operated at temperatures outside of peak efficiency, the catalyst has less tolerance to an over-reactive storage governor. Apart from temperature and age, the SCR catalyst experiences different levels of NOx input which affects its ability to deplete incoming DEF (reductant). At a higher incoming NOx level, the catalyst has the ability to consume more DEF from an aggressive storage governor output. For example, a +0.1 g NH3 storage deviation can be caused by a 6% of storage set point adjustment by the storage level governor for a fresh SCR device operating at 250 deg C. Alternatively, or in addition, the same +0.1 g NH3 storage deviation can be caused by a 10% of storage set point adjustment by the storage level governor for a fresh SCR device at 350 deg C. Further yet, the same +0.1 g NH3 storage deviation can be caused by a 15° % of storage set point adjustment by the storage level governor for an aged system at 350 deg C. Thus, the +0.1 g storage deviation should prompt different dosing governor response in these three situations, which a typical storage level governor does not address.

The technical solutions described herein address such technical challenges with the exhaust system, and particularly the SCR device, by accounting for such variations in catalyst behaviour with temperature, incoming NOx, aging and modulate the storage governor behaviour in response. For example, the modulation includes adjusting the storage governor gain term with (1) temperature (2) thermal aging (3) incoming NOx and thus facilitating flexibility to optimize the governor response in a variety of operating conditions, and in turn optimizing the tailpipe emission for an internal combustion engine.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for treating exhaust gas in a motor vehicle including an internal combustion engine, the emissions control system comprising:
   a selective catalytic reduction (SCR) device;
   an NOx sensor; and
   a controller that is configured to govern a reductant dosing in the SCR device by:
      computing a reductant dosing rate based on a chemical model of the SCR device;
      determining a temperature modulation factor based on an inlet temperature of the SCR device and on an inlet NOx concentration in the exhaust gas that is input to the SCR device, wherein the temperature modulation factor is determined by accessing a look-up table based on the inlet temperature and the inlet NOx concentration;
      adjusting the reductant dosing rate by scaling the reductant dosing rate by the temperature modulation factor; and
      causing an amount of reductant to be injected into the SCR device according to the adjusted reductant dosing rate.

2. The emissions control system of claim 1, wherein the reductant dosing rate is computed based on a rate of the exhaust gas that is input to the SCR device, and a difference in reductant stored in an SCR catalyst of the SCR device and a predicted amount of reductant stored in the SCR catalyst.

3. The emissions control system of claim 1, wherein determining the temperature modulation factor comprises accessing a look-up table corresponding to the inlet temperature.

4. The emissions control system of claim 1, wherein governing the reductant dosing in the SCR device further comprises:
   determining an age modulation factor for the SCR device; and
   adjusting the reductant dosing rate further by scaling the reductant dosing rate by the age factor.

5. The emissions control system of claim 4, wherein the age modulation factor is determined by monitoring temperature-weighted time of the SCR device.

6. An exhaust system for treating exhaust gas emitted by an internal combustion engine, configured to perform a selective catalytic reduction (SCR) of exhaust gas, the exhaust system comprising:
   a controller configured to govern a reductant dosing for the SCR by:
      computing a reductant dosing rate based on a chemical model of the SCR;
      determining a temperature modulation factor based on inlet temperature of exhaust gas input for the SCR and on an inlet NOx concentration in the exhaust gas that is input to the SCR device, wherein the temperature modulation factor is determined by accessing a look-up table based on the inlet temperature and the inlet NOx concentration;
      adjusting the reductant dosing rate by scaling the reductant dosing rate by the temperature modulation factor; and
      causing an amount of reductant to be injected into an SCR catalyst according to the adjusted reductant dosing rate.

7. The exhaust system of claim 6, wherein the reductant dosing rate is computed based on a rate of exhaust gases input to the SCR, and a difference in reductant stored in the SCR catalyst and a predicted amount of reductant stored in the SCR catalyst.

8. The exhaust system of claim 6, wherein determining the temperature modulation factor comprises accessing a look-up table corresponding to the inlet temperature.

9. The exhaust system of claim 6, wherein governing the reductant dosing in the SCR further comprises:
   determining an age modulation factor for the SCR catalyst; and
   adjusting the reductant dosing rate further by scaling the reductant dosing rate by the age factor.

10. The exhaust system of claim 9, wherein the age modulation factor is determined by monitoring temperature-weighted time of the SCR catalyst.

11. A computer-implemented method for controlling a selective catalytic reduction (SCR) device of an exhaust system of an internal combustion engine, the method comprising:
   governing a reductant dosing in the SCR device by:
      computing a reductant dosing rate based on a chemical model of the SCR device;
      determining a temperature modulation factor based on an inlet temperature of the SCR device and on an inlet NOx concentration in the exhaust gas that is input to the SCR device, wherein the temperature modulation factor is determined by accessing a look-up table based on the inlet temperature and the inlet NOx concentration;
      adjusting the reductant dosing rate by scaling the reductant dosing rate by the temperature modulation factor; and
   causing an amount of reductant to be injected into the SCR device according to the adjusted reductant dosing rate.

12. The method of claim 11, wherein the reductant dosing rate is computed based on a rate of exhaust gases input to the SCR device, and a difference in reductant stored in an SCR catalyst of the SCR device and a predicted amount of reductant stored in the SCR catalyst.

13. The method of claim 11, wherein governing the reductant dosing in the SCR device further comprises:
   determining an age modulation factor for the SCR device; and
   adjusting the reductant dosing rate further by scaling the reductant dosing rate by the age factor.

14. The method of claim 13, wherein the age modulation factor is determined by monitoring temperature-weighted time of the SCR device.

* * * * *